Oct. 17, 1967  D. F. GIBSON  3,347,262
MAGNET ACTUATED SEALED VALVE
Filed Sept. 22, 1965
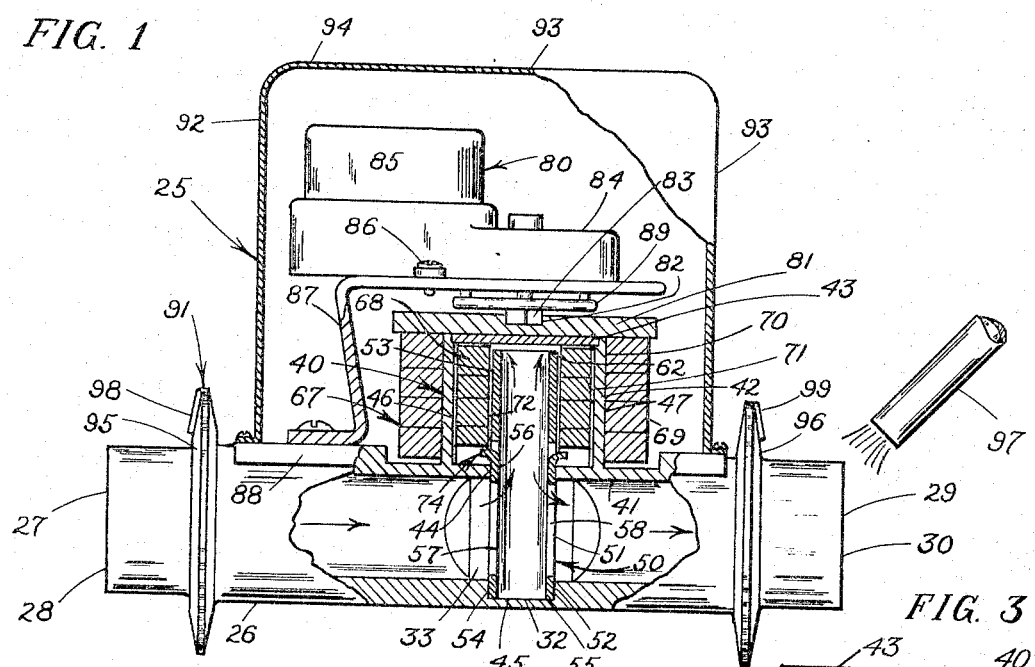
FIG. 1
FIG. 2
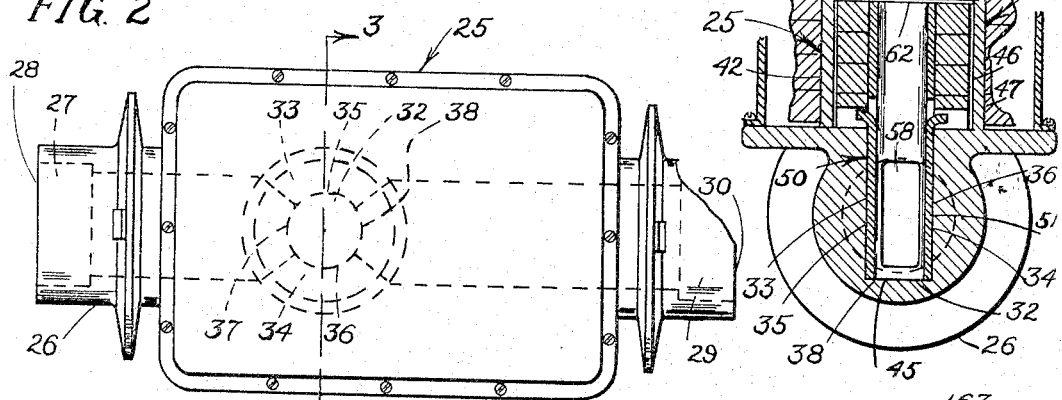
FIG. 3
FIG. 4
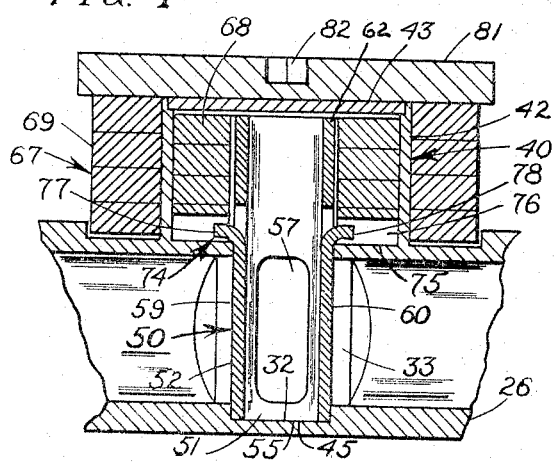
FIG. 5
INVENTOR.
DONALD F. GIBSON
BY
*Pearson + Pearson*
ATTORNEYS

United States Patent Office 3,347,262
Patented Oct. 17, 1967

3,347,262
MAGNET ACTUATED SEALED VALVE
Donald F. Gibson, Billerica, Mass., assignor to Mark Associates, Inc., Lowell, Mass.
Filed Sept. 22, 1965, Ser. No. 489,234
8 Claims. (Cl. 137—375)

This invention relates to an improved packless, sealed valve of the type actuated by a rotary magnetic coupling comprising concentric, annular sleeves.

Rotary, permanent-magnet couplings are well known and may be in the form of a pair of face-to-face magnets, separated by a flat sealing partition, or in the form of a pair of concentric, annular magnets, one inside and one outside an inverted cup-shaped sealing partition. Because of the disadvantageous axial forces found in face-to-face couplings, the device of this invention makes use of the sleeve type to eliminate magnetic axial forces and to eliminate thrust bearings.

The concentric annular magnets of this invention are preferably of the four segment type with opposite polarity, and are commercially available, for example as "Cera magnets" from the Stackpole Carbon Company, Magnet Division, Kane, Pa., or from General Magnetic Corporation, of Danvers, Mass. They develop no axial forces, require no thrust bearings, and with the relative thin gap partition and relatively close clearance between magnets taught herein, slippage occurs only with excessive torque well beyond the limits contemplated.

It has heretofore been proposed to use sleeve magnets of this type for actuating the valve rotor, or plug, of a packless valve, as in U.S. Patent No. 2,346,904 of Apr. 18, 1944, to Carlson. However, in the device of the Carlson patent, while axial forces are not caused by the sleeve magnets, the pressure of the liquid in the valve is exerted against the flat face of the inner magnet and against the flat face of the apertured closure member, tending to bind each against its adjacent wall of the valve. In addition to such liquid pressure axial binding forces the inner magnet and closure member are biased away from each other by a coil spring which may tend to add to the axial forces.

In this invention a rotatable valve plug, rotor or closure member is used, preferably in the form of a hollow tube of thin walled material, the thin, annular upper and lower edges of the tube being the only axial bearing faces and the tube presenting no flat faces transverse to flow which could cause axial thrust. Similarly, the inner magnet encircles the upper portion of the rotatable valve plug, within a chamber having not only a side wall and upper wall but also a bottom wall, the latter tending to prevent flow pressure in an axial direction on the lower, diametrical face of the inner magnet. In addition, the upper portion of the rotatable valve plug and the inner magnet are loosely attached to each other to permit the magnet to move axially on the tube and to centre itself in the flux of the outer magnet at all times. The clearance between the inner wall of the inner magnet and the outer wall of the upper portion of the rotatable plug is at least ten thousandths of an inch to permit the inner magnet to remain concentric with the cup shaped gap partition and outer magnet at all times. A groove, or recess, of relatively large dimensions, in the inner magnet receives at least one lateral protuberance, of relatively small dimensions, on the rotatable plug to cause the plug to turn with the inner magnet, but with substantial arcuate play, or looseness. Thus the inner magnet acquires slight momentum from the outer magnet before impacting the rotatable plug to thereby aid in unseating the plug for turning, and if there is slippage of the outer magnet, due to excessive requirement of torque, the inner magnet turns rearwardly slightly before again turning forwardly, to thereby dislodge any foreign material which may have made turning more difficult. Such a slippage occurs when the slippage torque of the coupling is overcome by the torque output of the power turning means due to sticking of the rotatable plug, the outer sleeve simply advancing angularly to a new position of polarity relative to the inner magnet.

The device of this invention not only makes use of magnetic sleeve couplings, but also incorporates a low voltage, synchronous, electric motor, reduction gear unit on the valve for automatic power turning of the outer sleeve. Both the magnets and the motor will be deteriorated by the heat of a torch, used in assembling the valve in a flow line, and the invention therefore includes a heat shield of imperforate metal located between each valve joint and the magnet, motor part of the valve.

The object of the invention is to provide a packless, sealed valve actuated by a rotary ring magnetic coupling which is of low cost, simple construction, and capable of being used in the water lines of a household heating system.

Another object of the invention is to provide such a valve with thermal barriers for protecting the magnets and motor from torch heat, thereby avoiding the necessity of dismantling the valve unit before installation.

A further object of the invention is to provide such a valve with a floating inner magnet and valve rotor plug so that any axial forces exerted by the line pressure is balanced by opposite forces, thereby maintaining the parts in normal position and avoiding axial thrust causing binding.

Still another object of the invention is to provide such a valve with a hollow tubular valve plug, having edge bearing faces at each opposite end, whereby liquid under pressure tends to float both the inner magnet and the plug and at no time tends to force a movable valve part tightly against a stationary part.

In the drawing:
FIGURE 1 is a side elevation, partially in half section, showing the valve unit of the invention.
FIGURE 2 is a plan view of the device shown in FIGURE 1.
FIGURE 3 is an end view of the valve casing shown in FIGURE 1, in half section, on line 3—3 of FIGURE 2.
FIGURE 4 is a fragmentary, enlarged view similar to FIGURE 1, showing the valve in closed position, and
FIGURE 5 is a side elevation, in half section, showing the device of the invention embodied in an elbow joint.

As shown in the drawing, the valve unit 25 of the invention includes the valve casing 26, having an influent port 27 at one end 28 thereof, and an effluent port 29 at the other end 30 thereof. The ports are so designated for clarity of description only, and the flow may be in the direction designated by the arrows, or in the opposite direction if desired. Intermediate of the flow path through the valve casing and intermediate of the ports 27 and 29, there is a generally cylindrical valve plug seat 32, the axis of the seat being transverse to the flow path through the casing.

As best shown in FIGURES 2 and 3, the flow path is constricted at inwardly projecting shoulders 33 and 34, to form vertically extending arcuate recesses 35 and 36 of about 90° angular distance, and to form the opposite, vertically extending openings 37 and 38.

A cylindrical enclosure 40 extends from casing 26 coaxial with the cylindrical seat 32 and is formed by the lower partition, or wall, 41, the thin, cylindrical, side wall, or gap partition, 42 and the upper wall 43. Preferably, the casing is cast with the lower wall 41 integral and imperforate, the side wall 42 integral but without the upper wall 43. The casting is then drilled to form the circular opening 44 in lower wall 41, the recesses 35 and 36 and the recess 45 forming the bottom of the seat. The upper wall 43 is a disc, silver brazed in position after assembly. The interior face 46 and the exterior face 47 of the side wall 42 are machined down to a thickness as small as possible while still being able to resist the expected pressure in the line in order to form the minimum gap partition, the thickness preferably being not more than forty thousandths of an inch.

The valve plug, or rotor, 50 preferably comprises a hollow, tubular body 51, having a thin cylindrical wall 52, of metal or other suitable material, and having an upper portion 53 and a lower portion 54. The lower portion 54 closely, and rotatably, fits within seat 32 with the lower circular edge face 55 supported in recess 45 and with the central portion 56 closely fitting opening 44 in lower partition 41. Preferably the lower portion 54 includes a pair of opposite flow apertures 57 and 58, separated by imperforate wall portions 59 and 60. Thus, as shown in FIGURE 1, when the apertures are aligned in the flow path, the valve is open, and, as shown in FIGURE 4, when the wall portions are aligned in the flow path, the valve is closed. The apertures 57, 58 and the walls 59, 60, are each about ninety degrees of angularity as shown.

The upper portion 53 of valve plug 50 includes the upper circular edge face 62 which bears loosely against the upper wall 43. Because body 51 is a hollow cylindrical tube, the liquid passing through apertures 57 and 58 and into the space 65 within the tube, tends to float the tube at all times, and there are no flat faces on the tube against which liquid can press to bind the tube in its seat with axial forces.

The magnetic coupling means 67 includes the inner cylindrical sleeve, or ring, 68 and the outer cylindrical sleeve, or ring, 69, both preferably being of the same height. As explained above, the magnets 68 and 69 are formed in four segments with opposite polarity for maximum attraction and preferably the clearance between the inner face 70 of outer magnet 69 and the outer face 71 of inner magnet 68 is about sixty thousandths of an inch. The outer face 71 of magnet 68 has a clearance of about ten thousandths of an inch from the inner face 46 of side wall 42 of enclosure 40 to permit slight tilting of the inner magnet. The inner face, or axial bore, 72 of inner magnet 68 is also of predetermined diameter slightly greater than the outside diameter of tubular body 51 to provide looseness and permit the inner magnet to centralize itself at all times or to move axially relative to the upper portion 53 of the tube.

It will thus be seen that outer magnet 69 has the minimum clearance from the exterior face 47 which permits it to rotate therearound without binding or touching, the gap partition 42 is of minimum thickness capable of resisting line pressure, and the inner magnet 68 is spaced with a predetermined clearance from the wall 42 to permit it to freely move axially, centralize itself and otherwise float freely within the chamber 74 of enclosure 40.

Loose fitting attachment means 74 operably connects inner magnet 68 with the upper portion 53 of rotatable valve plug 50. As shown, the lower diametrical face 75 of inner magnet 68 may conveniently be milled to form a groove 76 of relatively large dimensions for receiving at least one, or preferably a pair 77 and 78 of laterally projecting protuberances from upper portion 53, each protuberance being of relatively small dimensions. Preferably protuberances 77 and 78 are integral tabs, or ears, bent outwardly from the wall 52, but they may also be pins or in any other suitable form. The groove 76 is of sufficient height to permit the magnet 68 to move vertically with the protuberances still in the groove, and the protuberances 77 and 78 can move in an arcuate path within the groove for about five degrees of angularity. Thus the inner magnet can gather momentum before impacting the protuberances to cause the valve plug to rotate, and the magnet can move in the opposite direction, in the event the outer magnet inadvertently slips a turn relative thereto, to dislodge any foreign material causing excessive torque.

Automatic power turning of the outer magnet is provided by the reduction gear, low voltage electric motor means 80. As shown, the outer magnet 69 is fixed to a disc plate 81 having a squared central recess 82 for the squared drive shaft 83 of reduction gear unit 84. The motor 85 is mounted on unit 84, the unit 84 being fastened by bolts 86 to bracket 87 fixed to an integral platform 88 on casing 26. A wafer switch 89 is provided and suitable electric circuitry, well known to those skilled in the art, to cause the outer magnet to be rotated as desired to open and close the valve.

In many automatic valves containing O rings, packings, and the like, the 1600°F. heat of a propane torch used in installing the valve, may accidentally melt the same by raising temperature to 300°F. Similarly the magnets or motors of such a valve may be permanently damaged if inadvertently raised to 600°F.

The valve of this invention, which contains no packing, does have magnets and motors, so that thermal barrier means 91 is included therein. As shown, means 91 includes at least a pair of imperforate, metal shields 92 and 93, each located between one of the ports 27 and 29 and the adjacent portions of the motor 85 and magnetic coupling means 67. The shields 92 and 93 may conveniently be end walls of a removable box-like cover 94, as shown, and preferably a second pair, 95 and 96, of such shields are provided, each an integral ring on the housing. Thus there is little possibility of heat from a torch 97 reaching the delicate drive mechanism of the valve. A heat softenable metal 98 or 99 is affixed to the rings 94 and 95, arranged to melt at 450°F. to warn the torch operator that dangerous temperatures are occuring in proximity to the parts desired to be protected.

When the valve is closed the pressure of the liquid in the line while exerted against the nearer wall portion such as 59 of the tubular valve plug, is transmitted only to the relatively narrow, smooth, arcuate edges, or rims, on the far side of the recess 45 and the opening 44. Thus there is minimum opportunity for binding of the valve plug, when the magnetic coupling opens the valve. If leakage should occur past the first, or near, wall portion 59, such leakage is positively and efficiently stopped by the second, or far, wall portion 60.

As shown in FIGURE 5, a right angular valve casing 126 may be used having ports 127 and 128, a cylindrical valve plug seat 132 and a cylindrical enclosure 140. The valve plug 150 rotatably fits within seat 132 and includes the flow apertures 157 and 158 all corresponding generally with the valve of FIGURES 1 to 4. Magnetic coupling means 167 is identical with magnetic coupling means 67 and loose fitting attachment means 174 is identical with means 74.

I claim:
1. In a packless valve of the concentric cylindrical magnet actuated type, the combination of
a valve casing having influent and effluent ports, a generally cylindrical valve plug seat intermediate of said casing between said ports, the axis of said seat being transverse to the flow path through said casing, and a cylindrical enclosure extending from said casing, coaxially with said seat, said enclosure forming a sealed chamber opening into said casing at said seat;
magnetic rotary coupling means comprising an inner, hollow, cylindrical sleeve rotatable within said sealed chamber and an outer, hollow, cylindrical sleeve rotatable around the exterior of said enclosure, said inner sleeve having an axial bore of predetermined diameter and being of less height than the height of of said chamber to float vertically therein;
an elongated hollow tube mounted within said casing, said tube having an apertured lower portion rotatable in said seat to form a valve plug, and having its upper portion loosely fitted within the axial bore of said inner magnet for slight axial and transverse motion relative thereto, and loose fit attachment means connecting said inner magnet to the upper portion of said tube for transmitting rotary motion only therebetween, whereby rotation of said outer magnetic sleeve causes rotation of said inner magnetic sleeve and valve plug to actuate said valve while said inner magnet is free to float axially and free of axially directed forces thereon.

2. A packless valve as specified in claim 1, wherein the valve plug, lower portion of said tube includes a pair of oppositely disposed apertures, each extending about ninety degrees angularly therearound, whereby the oppositely disposed wall portions extending therebetween constitute two barriers to flow, with leakage past one said wall being stopped by the second said wall.

3. A packless valve as specified in claim 1, wherein said loose fit attachment means comprises a groove formed in the lower diametrical face of said inner magnetic sleeve, and at least one protuberance extending laterally from the upper portion of said tube, said protuberance loosely fitting within said groove to permit free relative axial movement and limited rotational movement between said tube and sleeve.

4. A packless valve as specified in claim 1, wherein the clearance between the exterior of said inner magnetic sleeve and the interior of said outer magnetic sleeve is less than sixty thousandths of an inch, and said enclosure includes a cylindrical side wall having a thickness of about forty thousandths of an inch, whereby said inner magnetic sleeve is relatively closely spaced from said outer sleeve but has a clearance of about ten thousandths of an inch within said enclosure in which it can temporarily tilt relative to the axis of said enclosure.

5. A packless valve as specified in claim 1, plus thermal barrier means mounted on said housing at each opposite end thereof, said means comprising a pair of imperforate metal shields, each located between one of said ports and said magnetic rotary coupling means, whereby the heat of a torch used in connecting said valve into a flow line is barred from inadvertently deteriorating the magnets of said coupling means.

6. A packless valve as specified in claim 1, plus reduction gear and low voltage electric motor means mounted on said housing and operably connected to said outer, hollow, cylindrical sleeve to rotate the same, whereby said valve may be remotely and automatically controlled.

7. A packless valve of the rotary, coupling, concentric, magnetic sleeve type, said valve comprising a valve casing having a generally cylindrical valve plug seat, the axis of said seat being transverse to the flow path through said casing;

an enclosure on said casing forming a sealed chamber for floatingly receiving the inner magnetic sleeve of said coupling, said enclosure including a thin, cylindrical side wall having a predetermined clearance of about ten thousandths of an inch with the exterior side wall of the said inner magnetic sleeve permitting said sleeve to tilt slightly within said enclosure;

power turning means for rotating the outer magnetic sleeve of said coupling, the torque output thereof being greater than the slippage torque of said coupling;

a rotatable valve plug mounted to rotate within said seat to control flow through said casing, said plug extending integrally up into said sealed chamber and being loosely received within said inner magnetic sleeve of said coupling, loose fitting attachment means operably connecting said plug to the inner magnetic sleeve of said coupling for permitting free relative axial movement therebetween and limited relative rotary movement therebetween, whereby said inner magnetic sleeve is free to float and center itself in the magnetic flux exerted by said coupling and free to turn through a limited arcuate path relative to said plug, but said plug is caused to turn with said magnet at the opposite terminal ends of said arcuate path.

8. A packless valve of the rotary, coupling, concentric, magnetic sleeve type said valve comprising:

a valve casing having a generally cylindrical valve plug seat, the axis of said seat being transverse to the flow path through said casing;

a rotatable valve plug mounted to rotate within said seat to control flow through said casing;

loose fitting attachement means operably connecting said plug to the inner magnetic sleeve of said coupling for permitting free relative axial movement therebetween and limited relative rotary movement therebetween, and power means on said valve for turning the outer magnetic sleeve of said coupling with a predetermined torque output greater than the slippage torque of said coupling, whereby said inner sleeve is temporarily magnetically repelled rearwardly during any overcoming of said slippage torque by said power means to thereby dislodge foreign material caught in said valve.

References Cited

UNITED STATES PATENTS 2,569,800 10/1951 Cataldo.
3,134,404 5/1964 Ziccardi.
3,240,218 3/1966 Dalder.

M. CARY NELSON, *Primary Examiner.*

HENRY T. KLINKSIEK, *Examiner.*